United States Patent [19]

Pauluk et al.

[11] Patent Number: 4,477,275
[45] Date of Patent: Oct. 16, 1984

[54] STATION INDICATOR

[75] Inventors: Harry J. Pauluk, Ocean City; Otto Zauner, Vineland, both of N.J.

[73] Assignee: Owens-Illinois, Inc., Toledo, Ohio

[21] Appl. No.: 457,346

[22] Filed: Jan. 12, 1983

Related U.S. Application Data

[63] Continuation of Ser. No. 239,949, Mar. 3, 1981.

[51] Int. Cl.³ .................... C03B 19/00; C03B 35/26; C03B 35/00
[52] U.S. Cl. ...................................... 65/158; 65/243; 198/341; 414/222
[58] Field of Search .................. 65/158, 243, 165; 264/40.1; 425/169; 73/432 R; 209/522; 29/705, 407; 10/2; 198/340, 341; 414/222

[56] References Cited

U.S. PATENT DOCUMENTS

| | | | |
|---|---|---|---|
| 2,700,154 | 1/1955 | Dilts | 65/158 X |
| 2,849,114 | 8/1958 | Noble et al. | 65/158 X |
| 3,268,318 | 8/1966 | Murley | 65/158 |
| 3,836,614 | 9/1974 | Neugrosehl | 264/40.1 |
| 4,062,914 | 12/1977 | Hinzpeter | 264/40.1 |
| 4,069,716 | 1/1978 | Vanasco et al. | 73/432 R |
| 4,157,206 | 6/1979 | Ikeda et al. | 198/341 X |
| 4,266,961 | 5/1981 | Wood | 65/158 X |
| 4,270,649 | 6/1981 | Mayer | 198/341 |

Primary Examiner—Kenneth M. Schor
Attorney, Agent, or Firm—John R. Nelson; Myron E. Click

[57] ABSTRACT

A device for use with machines having plural article fabrication or tooling stations and an exit path remote from the stations indicates the specific fabrication or tooling station upon which a given individual article was formed. The device includes a display device having indicia such as numerals which correspond to the plural stations and drive means which causes a specific indicia to be displayed as an article from the corresponding remote tooling station traverses a given reference location along the exit path. The device expedites rapid tracing or malfunctions to specific ones of the plural forming stations.

5 Claims, 4 Drawing Figures

STATION INDICATOR

This is a continuation of application Ser. No. 15-0875 filed Mar. 3, 1981.

BACKGROUND OF THE INVENTION

This invention relates generally to indicating devices and more specifically to such devices which indicate which specific station of a machine having plural fabrication or tooling stations formed a given article.

High speed production equipment is utilized in many industries to manufacture unitary products such as containers like glass vials and lightbulb envelopes, screws and threaded fasteners, and other component parts. Many machines which fabricate these parts utilize fabrication or tooling stations which progressivley form such unitary parts from metal, plastic, or glass stock. A machine which accomplishes the transformation of material stock into a finished article is understandably complex. Such a machine will typically include a plurality of fabrication or tooling stations remote from the location at which completed articles exit the machine. Such separation renders the detection and tracing of malfunctioning forming stations difficult inasmuch as no apparent relationship generally exists between a particular article departing the machine and the particular one of a plurality of identical moving or cycling forming stations which formed the article. In such instances, correction of the malfunction may typically be achieved only by shutting down the machine and inspecting several or all of the forming stations or on a trial and error basis. Furthermore, since the production speed of such machines may vary depending upon the particular products being formed or other considerations, mental counting procedures or timing devices external to the machine itself will result in an accurate indication only under given conditions.

As a specific example, small glass containers such as vials may be formed in machines known in the art as vertical vial machines. Such machines accept glass tube stock in plural rotating chucks. The rotating chucks are disposed about the periphery of a revolving carousel having a plurality of stationary heating and forming stations which transform the glass stock into vials. Such machines may also incorporate ware finish tooling stations which circulate in closed paths disposed on the periphery of and generally coincident with the path of travel of the machine chucks. The completed article is discharged from the machine at a location remote from the circulating tooling station which provided the vial finish and it is difficult, if not impossible, to accurately determine which of the tooling stations formed a given glass vial finish.

Trial and error correction of the malfunctioning or misadjusted tooling station will often result in the misadjustment of a properly operating tooling station. Alternatively, the machine may be shut down, and each of the tooling stations may be inspected or operated through one cycle to visually locate the malfunction. These approaches, of course, seriously reduce production and increase downtime; both factors resulting in increased production costs.

SUMMARY OF THE INVENTION

The invention is directed to a forming station indicating device which displays an identifying indicia corresponding to the one of a plurality of fabricating or tooling stations which formed a given individual article. The indicating device is located at a reference location, for example, adjacent the exit path of the articles from the machine such that an operator can simultaneously view both the exiting articles and the indicator display. The display is driven by means such as the machine drive, which is directly related to the machine speed, such that the display is accurate for all machine speeds and production conditions. Preferably, the station indicator comprises a wheel having a plurality of indicia such as numerals disposed about its periphery. Each of the numerals corresponds to one of the tooling stations. The wheel is preferably driven by the same drive means which drives the tooling stations. The station indicator is located adjacent the exit path of the products from the machine and rotates to display the number of a tooling station as an article formed by that tooling station passes a reference location along the exit path from the machine. It should be appreciated that various electric and electronic synchronized indication means which achieve this result are deemed to be obvious variations of it and therefore, to be within the scope of this invention. For example, position or rotation sensors on the tooling station drive means may be utilized to provide a pulsed signal to a suitable counter which steps and displays appropriate indicia in proper phase with the output of the machine, so as to indicate the tooling station in which a given article was formed in accordance with the intent and purpose of the instant invention.

Thus, it is an object of the instant invention to provide a device which indicates the specific fabrication or tooling station of a multiple station machine, upon which a given individual article was formed.

It is a further object of the instant invention to provide tooling station information which is directly related to the speed of the production machine, and therefore, accurate at all speeds.

It is a still further object of the instant invention to provide tooling station information directly to an operator of a multiple tooling station machine, which does not require counting or operator interpretation.

Further objects and advantages of the instant invention will become apparent by reference to the following specification and appended drawings.

DESCRIPTION OF THE PREFERRED EMBODIMENT

Figure 1:
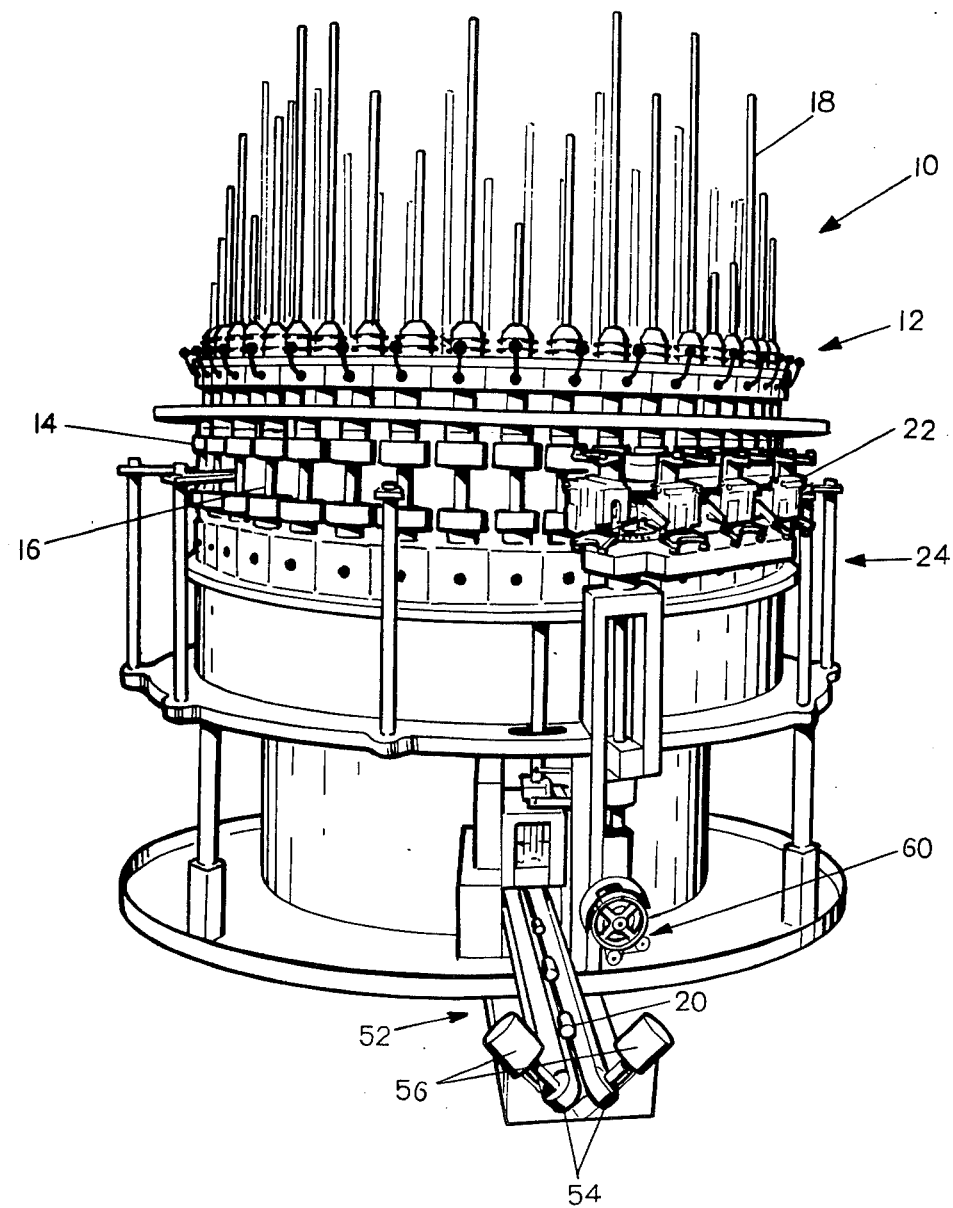
FIG. 1 is a perspective view of a vertical glass vial machine incorporating the instant invention.

Referring now to FIG. 1, a machine incorporating the instant station indicator invention is disclosed and generally designated by the reference numeral 10. The machine 10 illustrated is a vertical glass vial machine which fabricates glass vials from tubular glass stock. This specific machine 10 is illustrated by way of example only inasmuch as the instant invention will function equally well with various machines having multiple tooling stations which produce diverse products. The instant machine 10 is carousel-like in structure, having a plurality of work-supporting fixtures 12 which generally define the periphery of the machine 10 and which revolve about the central, vertical axis of the machine 10. The fixtures 12 each include an upper and a lower rotating chuck assembly 14 and 16, respectively, which rotate synchronously and which may be independently opened or closed as necessary during the production cycle to permit the feeding of new lengths of stock, such as glass tubes 18, as well as to permit the exit of articles from the machine 10, such as glass vials 20.

Again, for purposes of example, but in a fashion similar to machines in which the instant invention will find appropriate application, the vial machine 10 includes a plurality of tooling stations 22, which are disposed on and circulate about a pair of conveyor assemblies 24. Each of the tooling stations 22, includes means such as forming rollers and a mandrel (not illustrated) which cooperate to form the outer and inner surfaces of the finish of a vial 20, respectively, while the glass tube 18 is rotating in one of the upper chuck assemblies 14. The glass tube 18 now having a finish on its lower marginal edge is advanced downwardly into the vertically aligned, synchronously rotating lower chuck assembly 16. Heat is applied and the portion of the glass tube 18 having the finish on its lower margin is separated from the remaining glass tube 18; the surface tension of the heated glass creating a solid bottom on the upper end of the glass tube 18 now gripped in the lower chuck assembly 16, thereby forming a glass vial 20. Thus, the glass vial machine 10 sequentially forms the vial finish and then the end of one vial 20, each operation encompassing approximately 180° of revolution of the fixtures 12 on the machine 10.

The complete fabrication of one glass vial 20 requires substantially one complete revolution (360°) of the machine. And the forming of a vial finish in an upper chuck assembly 14 is accompanied by the forming of a vial bottom in the axially aligned lower chuck assembly 16. Inasmuch as each complete forming operation encompasses 180° of revolution of the fixtures 12, each operation can occur twice during one revolution of the fixtures 12 and, thus, substantially all heating, forming and tooling operations occur twice during one complete revolution of the fixtures 12 and the components that provide these functions are situated about the machine 10 in pairs at diametrically opposed locations.

Figure 2:
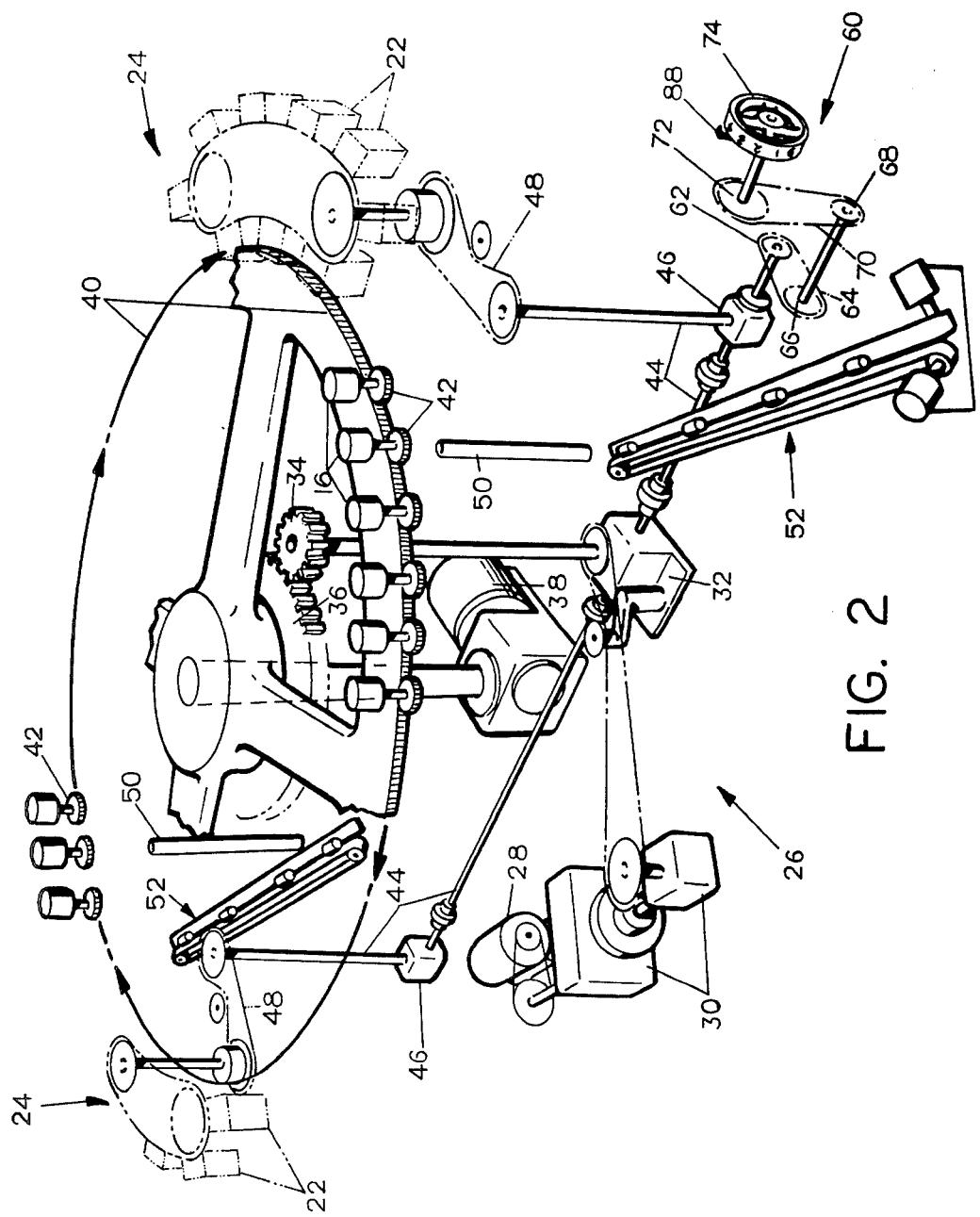
FIG. 2 is a diagrammatic perspective view of a drive mechanism of a vertical glass vial machine incorporating the instant invention.

Referring now to FIGS. 1 and 2, the machine 10 further includes a drive means 30 which provides and distributes energy to the revolving fixtures 12 of the machine 10, the rotating upper and lower chuck assemblies, 14 and 16, respectively, and the tooling stations 22. The drive means 30 includes a suitable electric motor 32 and speed reduction unit 34, which drives a centrally disposed power distribution means 36. The distribution means 36 revolves the central portion of the machine 10 through means not illustrated, and its revolution rotates the upper and lower chuck assemblies 14 and 16, respectively, by virtue of engagement between pinion gears 38 secured thereto and a respective pair of upper and lower stationary bull gears 40, only the lower gear 40 of the pair being illustrated in FIG. 2. The power distribution means 36 also provides rotary power to the conveyor assembly 24 through shafts 42, right angle drive assemblies 44 and sprocket and chain drives 46 to cause the tooling stations 22 to circulate about the conveyor assemblies 24.

The machine 10 further includes a pair of discharge assemblies comprising a chute 50 which receives and directs the articles of manufacture such as the glass vials 20 from the lower portion of the lower chuck assemblies 16 onto a radially oriented article conveyor 52. The article conveyor 52 comprises a pair of belts 54 disposed at right angles to one another and driven by a respective pair of drive means such as electric motors 56. The article conveyor 52 thus provides an exit path for the articles manufactured by the machine 10.

Figure 3:
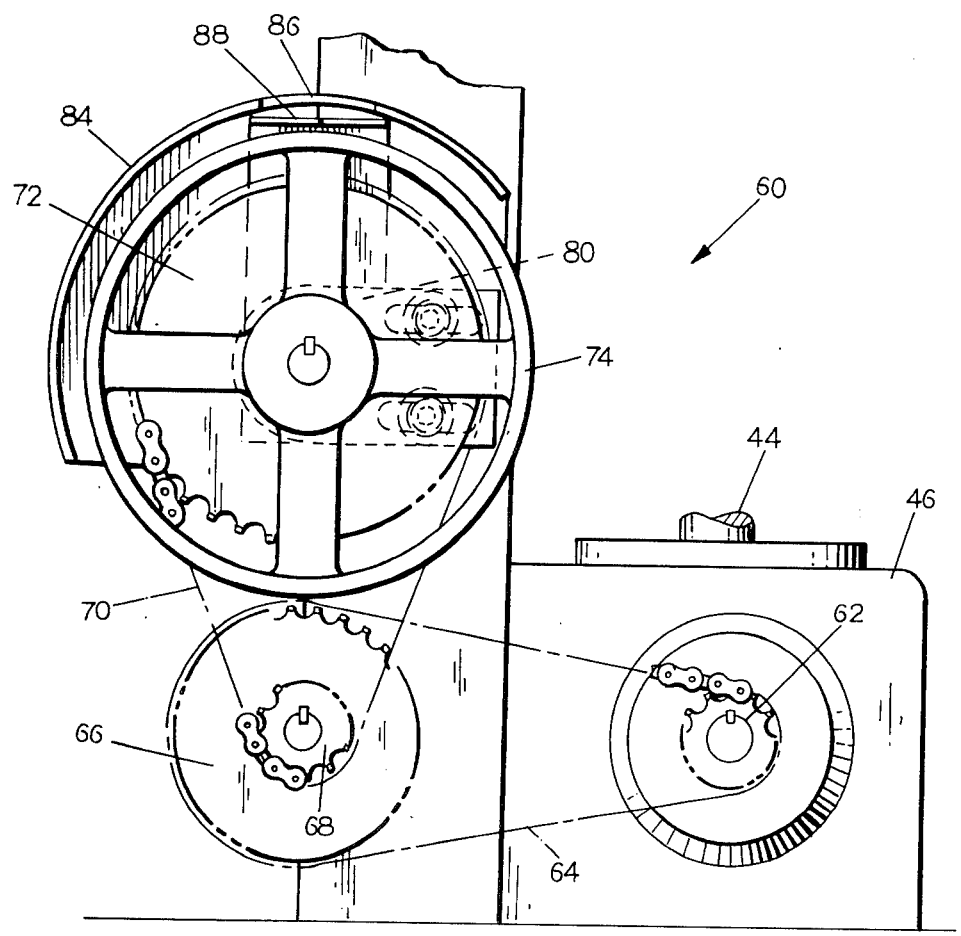
FIG. 3 is a side elevational view of a forming station indicator according to the instant invention.

Referring now to FIG. 1, and especially FIGS. 2 and 3, the machine 10 also includes a pair of station indicator assemblies 60. Each of the station indicator assemblies 60 includes a first sprocket 62 which is driven by an output means from the right angle gear box 44. A chain 64 is disposed about the sprocket 62 and positively drives a second sprocket 66.

Figure 4:
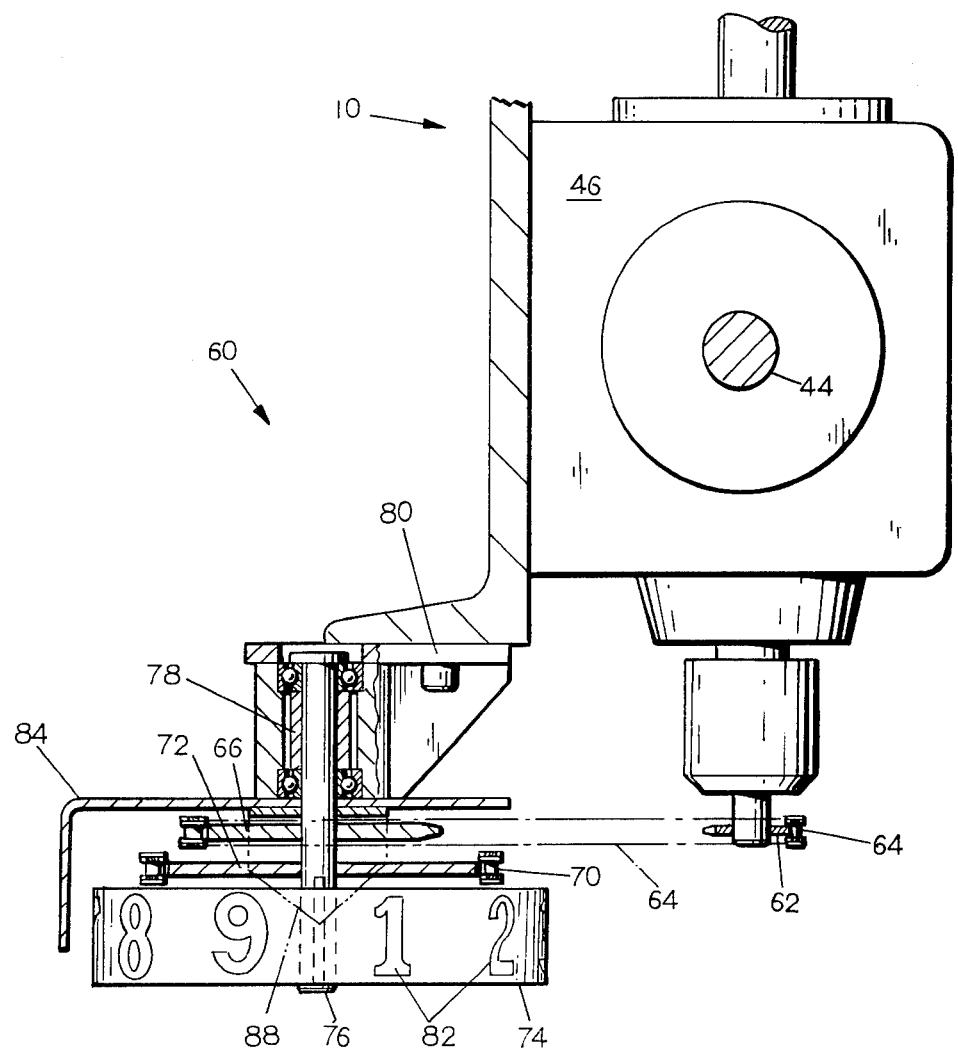
FIG. 4 is a top plan view of a forming station indicator according to the instant invention.

Referring now to FIGS. 2, 3, and 4, the second sprocket 66 is suitably mounted for rotation and includes a coaxially disposed third inner sprocket 68 about which a chain 70 is disposed. The third sprocket 68, through the chain 70, positively drives a fourth sprocket 72, which is secured to and rotates with an indicator wheel 74. The choice of relative diameters of the sprockets 62, 66, 68 and 72 is determined by the required speed reduction through this power train. Considerations regarding this choice of diameters is addressed below. The indicator wheel 74 is fixedly secured to a shaft 76, which is in turn supported on suitable bearings 78 disposed within structural members 80 of the machine 10. On the surface of the indicator wheel 74, at equally spaced intervals, are indicia 82 corresponding to the tooling stations 22. Preferably, the wheel 74 only includes a single indicia 82 for each of the tooling stations in order that they may be as large and as easily readable as possible. It should be apparent, however, that double or tiple sets of indicia 82, for example, disposed over circumferential intervals of 180° or 120°, respectively, may be utilized in certain applications if suitable reductions in drive speeds to the indicator wheel 74 are made as will be described below. The indicator wheel 74 is enclosed within a shroud 84 having a viewing window 86. The circumferential width of the viewing window 86 is slightly greater than the width of a single indicia 82. A pointer or hairline 88 may be positioned centrally within the viewing window 86 to reduce parallax error and thereby improve reading accuracy of the indicia 82.

In operation, the station indicator assembly 60 displays one of the indicia 82 on the wheel 74 which corresponds to the specific one of the tooling stations 22 which formed the finish on the vial 20 which is adjacent a reference location as it exits the machine 10 on the article conveyor 52. In view of the previous description of the machine 10, it should be appreciated that the particular tooling station 22 which formed a finish on a particular vial 20 is disposed on the conveyor assembly 24 most distant the article conveyor 52 upon which the particular vial 20 exits the machine 10.

In order to function properly, both the speed of rotation of the indicator wheel 74 and its phase must be proper. Given the common drive of the tooling stations 22 and the station indicator wheel 74, they will rotate in a relationship which may be characterized as proportional. If each of the tooling stations 22 cooperates with every one of the rotating fixtures 12 and the indicator wheel 74 includes one each of the indicia 82 corresponding to the tooling stations 22, this rotational relationship shoud be 1:1, i.e., the tooling stations 22 should complete one circuit around the conveyor assembly 24 as the indicator wheel 74 completes one revolution. Clearly, the components of the drives to one or the other or both of the tooling stations 22 or indicator wheel 74 may be adjusted to achieve this desired relationship. If two sets of the indicia 82 are disposed about the periphery of the indicator wheel 74, its drive speed should be reduced to one-half of that described in the example above by appropriate changes in the diameters of the sprockets 62, 66, 68 and 72. Similarly, changes in the relative drive ratio between the indicator wheel 74 and the tooling stations 22 may be selected to accommodate various tooling cycle schemes and the indicia 82 may be disposed about the periphery of the indicator wheel 74 out of numeric, alphabetic or other order, but in an order which corresponds, when rotated or otherwise sequentially displayed, to the order of utilization of the tooling stations 22 and the order of articles formed thereby and exiting therefrom.

The phase of the indicator wheel 74, i.e., that relative relationship between the indicia 82 displayed through the viewing window 86 and the identity of the tooling station 22 which formed a specific article, e.g., the glass vial 20, which is generally positioned at a reference location, such as adjacent the station indicator 74 on the conveyor 52, is also critical. This phase relationship is a function of the time elapsed between the departure of the article from the particular tooling station 22, to its arrival at the reference location on its exit path, i.e., the article conveyor 52 from the machine 10. This time, of course, includes the time which elapses as the bottom of the vial 20 is formed and the fixtures 12 of the machine 10 revolve approximately 180°. Since the mechanical drives to the revolving fixtures 12 on the machine 10, the tooling stations 22 on the conveyor assembly 24 and the station indicator assembly 60 are common and proportional, the position of one of the lower chuck assemblies 16 which is carrying and is about to discharge a glass vial 20 having a finish tooled in one of the forming stations 22, is positively ascertainable. Therefore, the significant variable is the time taken by the article to move radially outwardly on the article conveyor 52 to the reference location. The phase of the indicator wheel 74 is perhaps most easily adjusted by the use of a tracer vial 20 which is released from a known tooling station 22; the indicator wheel 74 then being manually adjusted to indicate the corresponding indicia 82 as the vial or other fabricated article passes a reference location, preferably the indicator wheel 74 itself, as it exits the machine 10. So adjusted, the station indicator 74 will accurately display the number of the particular tooling station 22 which has tooled or fabricated a given article, and thus greatly simplify the tracing of a malfunctioning tooling station 22 by immediately providing visual identification of the responsible tooling station 22 as a defective or improperly formed article exits the manufacturing device. It should be apparent to those skilled in the art that the indicator of the instant invention has wide application to machines wherein discharge of articles therefrom is at any location remote and visually isolated from the particular forming or fabricating machine station which produced it.

The foregoing disclosure is the best mode devised by the plural inventors for practicing this invention. It is apparent, however, that devices incorporating modifications and variations to the instant invention will be obvious to one skilled in the art of fabricating machines. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

What is claimed is:

1. An apparatus for tooling a plurality of articles, said apparatus comprising,
    a stationary frame
    a generally circular carousel mounted on said frame for ratation,
    a plurality of tooling fixture means disposed on said carousel for receiving, holding and releasing said articles,
    at least one conveyor assembly located near the periphery of the carousel and having a path adjacent to the carousel periphery, the path being spaced from the periphery portion of the carousel and the path including an arcuate path portion in which all points of the arcuate path portion are about the same distance from the carousel periphery,
    a plurality of tooling stations for tooling the plurality of articles, the tooling stations being carried by the conveyor assembly in a closed path in which a portion of the path is adjacent to the tooling fixtures,
    indicator means for indicating a particular one of said tooling stations that tooled a particular one of said articles as the particular one article moves past a reference location,
    discharge means having the reference location thereon, the discharge means including an inclined chute having its upper end located underneath the path of the tooling fixtures for receiving finished articles from the tooling fixtures and moving the articles to a discharge end below and spaced away from the periphery of the carousel,
    the indicator means including a plurality of moveable displayable indicia,
    there being drive means for revolving the tooling fixtures on the carousel around the periphery thereof, for moving the tooling stations on their closed path adjacent to periphery of the carousel, and for moving the indicia of the indicator means, the drive means being so constructed and arranged that each displayable indicia corresponds to the particular one of the tooling fixtures which held the particular one article and to the particular one of the tooling stations which tooled the particular one article.

2. The apparatus of claim 1 in which the indicator means includes an elongate scale and indicia are disposed in generally juxtaposed relationship along the scale.

3. The apparatus of claim 1 in which the indicia are displayed about the surface periphery of a wheel and there is a fixed pointer to indicate the particular one of the tooling stations that tooled a particular one of the articles.

4. The apparatus of claim 1 in which there are two conveyor assemblies, two discharge means, and two indicator means.

5. The apparatus of claim 1 in which the indicator means is disposed adjacent to the reference location that is located on the discharge chute.

* * * * *

UNITED STATES PATENT AND TRADEMARK OFFICE
CERTIFICATE OF CORRECTION

PATENT NO. : 4,477,275
DATED : October 16, 1984
INVENTOR(S) : Harry J. Pauluk and Otto Zauner It is certified that error appears in the above-identified patent and that said Letters Patent are hereby corrected as shown below:

Column 1, line 4, "15-0875" should be -- 239,949 --

Column 1, line 17, "progressivley" should be -- progressively --

Column 4, line 37, "tiple" should be -- triple --

Column 6, line12 (Claim 1) "ratation" should be -- rotation --

Signed and Sealed this

Second Day of July 1985

[SEAL]

Attest:

DONALD J. QUIGG

Attesting Officer

Acting Commissioner of Patents and Trademarks